UNITED STATES PATENT OFFICE.

ROBERT ATHELSTAN MARR, OF NORFOLK, VIRGINIA, ASSIGNOR TO AMERICAN WOOD ENCYSTING CO., INCORPORATED, OF NORFOLK, VIRGINIA, A CORPORATION OF VIRGINIA.

IMPREGNATED WOOD AND PROCESS OF PRODUCING THE SAME.

13,952. Specification of Reissued Letters Patent. Reissued July 27, 1915.

No Drawing. Original No. 1,121,644, dated December 22, 1914, Serial No. 811,910. Application for reissue filed June 10, 1915. Serial No. 33,401.

*To all whom it may concern:*

Be it known that I, ROBERT ATHELSTAN MARR, a citizen of the United States, residing at Ghent, Norfolk, in the county of Norfolk and State of Virginia, have invented certain new and useful Improvements in Impregnated Wood and Processes of Producing the Same, of which the following is a specification.

The present invention relates to the treatment of wood for waterproofing and preserving the same, and while of general application has special reference to the treatment of certain varieties of wood having a low specific gravity, to render them particularly suitable for use in making various buoyant articles, such as life-preservers, fenders, floats, buoys and the like.

It is a well-known fact that certain varieties of wood, particularly balsa and ceiba woods, are very light, that is, they possess a very low specific gravity (below .25), and it has been proposed to use these woods in place of cork in life-belts and similar devices, but it has been found that these woods are not entirely suited for the purposes mentioned, for the reasons, first, that they readily absorb and take up large quantities of water, which greatly decrease their buoyancy and, secondly, these varieties of wood are very susceptible to decay and insect attack, such as attacks by teredo and other wood-destroying organisms. These objectionable properties render the wood in its natural condition, unsuited for use in life preservers and in substantially all buoyant articles, especially those destined to be used in sea water, and accordingly most of the suggestions heretofore made for so employing these varieties of wood have not been entirely successful.

In the present invention I treat wood with a bath containing paraffin, rosin, and diatomaceous earth or equivalents thereof, which process I have found to be particularly suitable for application to the varieties of wood above referred to, and I have also found that certain modifications of this process are capable of producing excellent results in the treatment of woods of these stated varieties and similar kinds of wood, suitable for use in the production of buoyant articles, as well as for structural purposes.

In carrying out my present invention, wood in pieces of suitable size and shape for use in making life-preservers or for any other desired use, is subjected to the action of a bath comprising paraffin, rosin and diatomaceous earth, to which bath a small amount of Paris green or a dye soluble in the bath, or both, may or may not be added, depending upon whether or not the production of certain properties is desired. This bath will preferably be used in the first part of the process at a temperature somewhat above the boiling point of water, a temperature of 250° F. being suitable, during the action of which bath, the moisture content of the wood is largely or entirely driven out, and more or less of the bath is absorbed by the wood. The temperature of the bath may be lowered more or less, depending upon the amount of impregnation or encysting of the wood which is desired. For the production of blocks of wood for use in life-preservers, it is ordinarily not necessary or desirable to give a heavy impregnation, for the reason that it is desirable to produce a finished product having as low a specific gravity as possible, in order to have high buoyant effect. In order to produce the low impregnation, I preferably do not allow the temperature of the bath to fall more than a few degrees, say from 250° F. at the beginning of the operation, down to 180 or 200° F., at which point the wood is preferably removed from the bath, and allowed to further cool to ordinary temperature.

Instead of allowing the temperature of the entire bath to fall, after the wooden articles have been immersed in the hot bath for a short time, at a temperature of 250° F. (more or less) I may remove said articles from the bath, and immerse the two ends of the same (first one end and then the other) in a bath of similar composition, or another bath, maintained at a temperature of 180° F. (more or less).

The second bath, that is to say, the bath employed in the second step, of which the temperature may, as above stated, be about 180° F., may be composed of the same materials as employed in the first bath, said materials being in the same or in different proportions. This bath may also if desired be composed of different materials from those employed in the first bath. Obviously the materials employed in the second bath must be such materials as will not injure the wood, or the amount of the first bath which has been absorbed by the wood. One of the functions of the said bath is to cool the wood more or less, in order to condense any particles of steam which may be contained therein, and thereby suck in whatever amount of the first bath may be adhering to the outside of the block of wood; also, if the wood is allowed to remain for a considerable time in the second bath, a material amount of the ingredients of the second bath will also be sucked into the wood, or absorbed thereby.

The time of immersion and cooling may vary more or less, depending on the size of the wooden pieces, the amount of impregnation desired, moisture content of the wood, and other factors, but I have found that for blocks of balsa wood of two inches square, and four inches long, a hot bath (say 250° F.) for five minutes and then cooling to about 180° F. during two minutes give excellent results.

The impregnation of the surface portions of the wood is in this manner made quite complete, while the interior portions of the wood are not saturated with the impregnating material; but a small amount of the material will be carried, by means of the large ducts existing in these varieties of wood, practically throughout the body of the material, whereby the paraffin, rosin and diatomaceous earth are caused to be thoroughly disseminated in very small amounts, through the entire body of the wood, while the small air spaces throughout the body of the wood are not filled with the impregnating material. In this way, I can produce blocks having very low specific gravities, which are thoroughly and completely waterproofed, and preserved against rot, and attack of marine insects and similar wood-destroying agencies. The wood thus treated has been found to possess qualities which render it particularly suitable for insulation purposes, such as heat insulation, sound insulation, and electrical insulation.

As a modified mode of procedure, I can incase the blocks of wood, in the duck, canvas or other fabric forming the body of the life-belt or similar structure, and then treat the finished article by the process of impregnation, which not only preserves the wood, but also preserves the fabric against destructive agencies, such as dry rot and the like.

In making certain other kinds of buoyant articles, it is not desired to produce such a high degree of buoyancy, instances of this being life-boats, fenders, buoys for anchoring boats and the like, and in the treatment of articles of this character I find that a heavy impregnation of the article with the preservative specified is a material advantage, since these articles are likely to be deeply chipped by the action of boats striking the same, and otherwise, and a complete impregnation or substantial saturation of the woods in question is particularly advantageous, in order to insure the article against decay or insect attack at those points where the article has received injury.

The use of rosin as above stated is a distinct advance in the art. This material hardens the wood to a material extent, and makes the wood tougher; also the wood so treated is easier to cling to, on account of the adhesiveness of the surface. This material aids in the impregnation by acting as a carrier.

It has heretofore been proposed to impregnate wood by immersing the same in a bath containing molten paraffin; however, such a treatment does not give any material amount of impregnation, on account of the fact that the paraffin is not really absorbed by wood, whether the wood be green or dry. The addition of rosin in the present invention aids in the absorption of the impregnating material by the wood, or in effect appears to act as a carrier for the paraffin, as above stated; that is to say, its presence causes the paraffin to penetrate throughout the wood and to encyst the cells of the wood; and this is true whether the wood be of high or of low specific gravity.

In producing the heavy impregnation, in such cases as above referred to, I preferably introduce the wood, in a rather moist condition, into a bath of the specified materials, at a somewhat higher temperature, say 250° to 275° F., 260° being preferred, then allow the temperature to drop slowly, while the wood is immersed in the liquid, to a temperature down to near the solidifying point of the treating bath, or by treating in a hot bath, and then a cold bath, for a rather long time.

In carrying out the impregnation process in all the modifications the material is immersed and held under the surface of the bath. I desire to call attention to the fact that the wood when so treated may be coated, if so desired, over all or a part of its surface with paint, either for ornamentation, or marking purposes. In using ordinary paint, it is preferable to first apply a coat of shellac.

If desired, I may add to the impregnating bath any suitable oil-soluble dye, which will be carried into the wood, wherever the preservative is carried.

The bath used in impregnating the material may consist of the materials in the following proportions by weight, although the invention is not limited thereto, and the proportions may be materially altered without departing from the spirit of the invention: paraffin 100 parts, rosin 5 to 10 parts, diatomaceous earth 2 to 7 parts, to which may be added, if desired, Paris green 1 part, more or less.

The use of diatomaceous earth in this connection has a special function, since this material is of a sufficient fineness, so that 90% thereof will pass through the meshes of a bolting cloth having 40,000 meshes to the square inch. This material is also extremely hard, being composed of substantially pure silica, and I find that this material is very much harder than the mandibles or biting parts of marine insects, such as teredo, limnoria and the like, which are composed essentially of calcium carbonate. From the relative hardness of these two, it will be apparent that whenever these insects attempt to bore into wood or other materials impregnated with diatomaceous earth, their mandibles will very quickly be destroyed, which will effectively destroy or kill the insects. It will be noted also that diatomaceous earth has a particular advantage over many of the other materials of similar hardness, since it is wholly inert and cannot be affected or destroyed by sea water or the like. The use of Paris green in this connection is materially different from the diatomaceous earth, since it is not carried into the interstices of the wood, to any great extent, but remains as a surface coating on the wood.

The wood for ring buoys may be made in the form of rings, which may be "built up" (composed of three or more layers, united by a suitable waterproof glue) if desired, and these may be covered by duck or the like, before impregnation, if desired. Also I may treat the wood in the form of large pieces, logs or the like, and afterward, if small pieces are needed I may cut this to produce pieces of the proper size for the particular use, if so desired. This method is not to be generally recommended, in the case of material having a very light impregnation, since it is desirable to have a rather heavy superficial impregnation over the surface portions of the article. This method is, however, sometimes advantageous in the manufacture of heavily impregnated blocks, boards etc.

For light impregnation, I may use wood in its air dry condition, to advantage, while for heavy impregnation I preferably use wood which is more or less saturated with water, or sap. Green wood, directly after being cut, is suitable.

It is my opinion that the dissemination of the preservative throughout the body of the wood is aided by osmosis.

The impregnation of wood of the varieties above referred to, with a mixture of paraffin, naphthalene, and diatomaceous earth, with or without rosin and Paris green, is claimed in my Patent No. 1,121,645, issued under der date of December 22, 1914, applications for which were concurrently pending with my original application No. 811,910, Patent No. 1,121,644, of which this is a reissue.

The impregnation of fabrics and certain other materials by the methods described herein forms the subject-matter of my Patents Nos. 1,121,647 and 1,121,648, issued under date of December 22, 1914, applications for which were concurrently pending with my original application No. 811,910, Patent No. 1,121,644, of which this is a reissue.

The treatment of woods generally, particularly lumber, piling, and railroad ties, by means of a preservative comprising paraffin, naphthalene, and diatomaceous earth is claimed in my Patent No. 1,121,643, issued under date of December 22, 1914, application for which was concurrently pending with my original application No. 811,910, Patent No. 1,121,644, of which this is a reissue.

The treatment of wood with a preservative including Paris green as described herein, is claimed in my Patent No. 1,121,646, issued under date of December 22, 1914, application for which was concurrently pending with my original application No. 811,910, Patent No. 1,121,644, of which this is a reissue.

What I claim is:—

1. A process of treating woods of low specific gravities, which comprises impregnating said woods with a mixture comprising rosin, and a melted hydrocarbon material, said mixture containing a finely-divided solid material.

2. A process of treating woods of low specific gravities, which comprises lightly impregnating said woods with a mixture comprising rosin, and a melted hydrocarbon material, said mixture containing a finely-divided solid material.

3. A process of treating woods of low specific gravity, which comprises immersing said woods in a bath comprising paraffin, rosin, and diatomaceous earth, while said wood contains some moisture.

4. A process of treating moist woods of low specific gravities, said process comprising immersing the wood of the class specified in a bath comprising paraffin, rosin, a dye soluble therein, and diatomaceous earth.

5. A process of treating wood of low specific gravity, said process comprising the steps of placing said wood in a permeable envelop, and thereafter subjecting the same to a heated bath containing paraffin, rosin, and diatomaceous earth.

6. A process of treating wood of low specific gravity, which comprises immersing the same in a bath containing paraffin, rosin and diatomaceous earth, at a temperature above the boiling-point of water, then treating the same with a bath composed of material not injurious to said wood, or to said first bath, said second bath being maintained at a temperature lower than that employed in said first treatment.

7. A process of treating balsa and ceiba wood, which comprises treating the same with a bath containing diatomaceous earth and a vehicle insoluble in water, said vehicle including rosin.

8. A process of treating balsa, ceiba and similar varieties of wood, which comprises treating the same with a bath comprising paraffin, rosin and diatomaceous earth, at a high temperature, then with a bath containing paraffin at a lower temperature, until the desired impregnation is secured.

9. A process of treating balsa, ceiba and similar varieties of wood, which comprises treating the same with a bath comprising paraffin, an oil-soluble dye, rosin and diatomaceous earth, at a high temperature, then with a second bath comprising paraffin, at a lower temperature, until the desired impregnation is secured.

10. A process of treating balsa, ceiba, and similar varieties of wood, which comprises treating the same with a bath comprising paraffin, an oil-soluble dye, rosin, Paris green, and diatomaceous earth, at a high temperature, then treating said wood with a second bath containing paraffin, said second bath being maintained at a lower temperature, until the desired impregnation is secured.

11. A process of treating balsa, ceiba, and similar varieties of wood, which comprises treating the same while incased in a fabric cover with a bath comprising paraffin, rosin and diatomaceous earth, at a high temperature, then with a preservative bath at a lower temperature, until the desired impregnation is secured.

12. A process of treating woods of relatively low specific gravity, which comprises subjecting the same to the action of a bath containing an insoluble finely-divided solid material, having a hardness greater than that of which the biting parts of marine wood-destroying insects is composed, an insoluble hydrocarbon carrier which melts at a temperature below the boiling-point of water, and which is solid at ordinary temperatures, and rosin.

13. A process of treating woods of those varieties having a relatively low specific gravity, which comprises subjecting the same to the action of a bath comprising paraffin, rosin, Paris green, and diatomaceous earth.

14. An article of manufacture, comprising a wood of relatively low specific gravity, impregnated with a preservative, including diatomaceous earth, and a vehicle comprising paraffin and rosin.

15. An article of manufacture, comprising a wood of relatively low specific gravity, impregnated with a preservative including diatomaceous earth, and a vehicle comprising paraffin, rosin, and an oil-soluble dye.

16. An article of manufacture, comprising a wood of relatively low specific gravity, impregnated with a preservative including diatomaceous earth, and a vehicle comprising paraffin, and rosin, said wood having a coating of material including Paris green.

17. An article of manufacture, comprising a wood of relatively low specific gravity impregnated with a preservative including diatomaceous earth, and a vehicle comprising paraffin and rosin, said wood having a casing of fabric impregnated with a similar preservative.

18. An article of manufacture, comprising a balsa wood, impregnated with a preservative including diatomaceous earth, and a vehicle comprising paraffin and rosin.

19. An article of manufacture, comprising wood of relatively low specific gravity, impregnated with a preservative material including an insoluble finely-divided solid material, having a hardness greater than that of the material of which the biting parts of marine wood-destroying insects is composed, an insoluble hydrocarbon carrier which melts at a temperature below the boiling-point of water, and which is solid at ordinary temperatures, and rosin.

20. An article of manufacture, comprising wood of relatively low specific gravity, impregnated with a preservative material including an insoluble finely-divided solid material, having a hardness greater than that of the material of which the biting parts of marine wood-destroying insects is composed, an insoluble hydrocarbon carrier which melts at a temperature below the boiling-point of water, and which is solid at ordinary temperatures, and rosin, said wood being coated with a material including an insoluble poisonous compound.

21. A process of preserving wood, which comprises immersing said wood in a mixture comprising paraffin, rosin, and diatomaceous earth.

22. A process of preserving wood, which comprises immersing said wood in a bath containing paraffin, rosin and diatomaceous earth, at a temperature above the boiling-point of water, and then treating the same with a bath composed of material not injurious to said wood, or to the first bath, said second bath being maintained at a temperature lower than that employed in said first treatment.

23. Wood impregnated with a preservative including diatomaceous earth in a vehicle, said vehicle comprising paraffin and rosin.

24. Wood impregnated with a preservative comprising diatomaceous earth in a vehicle, said vehicle comprising paraffin and rosin, said wood having a coating of a material including Paris green.

25. A process of impregnating wood, which consists in placing the same in a bath containing paraffin and rosin, and retaining the same therein until impregnation is effected.

26. A process of treating wood, which consists in placing the same in a bath containing melted paraffin and rosin, and retaining such bath in melted condition until the wood is thoroughly impregnated.

27. A process of treating wood, which consists in placing the same in a bath containing a relatively large amount of melted paraffin, together with a relatively small amount of melted rosin, and retaining the bath in melted condition until impregnation is effected.

28. That process of waterproofing wood, which consists in placing the same in a bath containing melted paraffin in which there is present as a carrier for the paraffin melted rosin.

29. The process of treating timber, which consists in impregnating it with melted paraffin, solid at normal atmospheric temperatures, by the use of melted rosin mixed therewith to cause the paraffin to penetrate throughout the timber.

30. The process of treating timber, which consists in impregnating it with melted paraffin, solid at normal atmospheric temperatures, by the use of melted rosin mixed therewith in a bath to cause the paraffin to penetrate throughout the timber, the bath being raised to a temperature approximating 250° F.

31. An article of manufacture comprising timber the cells and pores of which are encysted throughout by a mixture containing paraffin, solid at normal atmospheric temperatures, and rosin.

32. An article of manufacture, comprising wood of low specific gravity impregnated with a mixture containing rosin and paraffin solid at normal atmospheric temperatures.

In testimony whereof, I have affixed my signature hereto in the presence of two subscribing witnesses.

ROBERT ATHELSTAN MARR.

Witnesses:

HORACE A. DODGE,

BENNETT S. JONES.